US008613032B2

(12) United States Patent
Yoshida

(10) Patent No.: US 8,613,032 B2
(45) Date of Patent: Dec. 17, 2013

(54) TELEVISION APPARATUS AND DISPLAY CONTROL METHOD

(75) Inventor: Osamu Yoshida, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/295,756

(22) Filed: Nov. 14, 2011

(65) Prior Publication Data

US 2012/0246694 A1    Sep. 27, 2012

(30) Foreign Application Priority Data

Mar. 25, 2011   (JP) .................................. 2011-068930

(51) Int. Cl.
*H04N 7/173*   (2011.01)

(52) U.S. Cl.
USPC ............................ 725/115; 725/116; 725/117

(58) Field of Classification Search
USPC ................................................ 725/115–118
See application file for complete search history.

(56) References Cited

U.S. PATENT DOCUMENTS

| 2005/0155012 | A1  |  7/2005 | Tayama et al. |         |
|--------------|-----|---------|---------------|---------|
| 2005/0246654 | A1* | 11/2005 | Hally et al. .................... | 715/779 |
| 2006/0265505 | A1* | 11/2006 | Philyaw et al. ............... | 709/227 |
| 2010/0058423 | A1* |  3/2010 | Yaussy et al. ................. | 725/118 |
| 2010/0218102 | A1* |  8/2010 | Kishi ............................ | 715/733 |

FOREIGN PATENT DOCUMENTS

| JP | 2001008124 A | 1/2001 |
| JP | 2001189706 A | 7/2001 |
| JP | 2002108323 A | 4/2002 |
| JP | 2003204335 A | 7/2003 |
| JP | 2003209524 A | 7/2003 |
| JP | 2006-221419  | 8/2006 |
| JP | 2006324824 A | 11/2006 |
| JP | 2007074009 A | 3/2007 |
| JP | 2008-507004  | 3/2008 |
| JP | 2009026084 A | 2/2009 |
| WO | WO-03/069470 | 8/2003 |

OTHER PUBLICATIONS

Office Action for Japanese Patent Application No. 2011-068930 dated Apr. 24, 2012.
Office Action for Japanese Patent Application No. 2011-068930 dated Jan. 17, 2012.
Office Action for Japanese Patent Application No. 2012-188000 dated Aug. 6, 2013.

* cited by examiner

*Primary Examiner* — Jason J Chung
*Assistant Examiner* — Sumaiya A Chowdhury
(74) *Attorney, Agent, or Firm* — Patterson & Sheridan LLP

(57) ABSTRACT

According to one embodiment, a television apparatus includes: a specific receiver configured to receive, from a communication apparatus connected via a network, list information of a plurality of network services each of which provides data, destination information indicating a connection destination for each of the network services, and setting information corresponding to each of the network services and indicating a setting to a display to receive the data from each of the network services; a display controller configured to control displaying of the list information; a selection receiver configured to receive a selection of the network service included in the list information that is displayed; and a setting controller configured to set the display according to the setting information corresponding to the selected network service and configured to control the display to display the data received from the connection destination for the selected network service indicated by the destination information.

6 Claims, 9 Drawing Sheets

FIG.5

```
DISPLAY FORMAT
MENU INTEGRATION

1. FIRST SERVICE PROVIDER    :URL=http://111.com
      LAUNCHING BROWSER=FIRST WEB BROWSER, LAUNCHING MODE=1, CONTROL OPTION=4
2. SECOND SERVICE PROVIDER   :URL=http://555
      LAUNCHING BROWSER=FIRST WEB BROWSER, LAUNCHING MODE=2, CONTROL OPTION=3
3. THIRD SERVICE PROVIDER    :URL=http://222
      LAUNCHING BROWSER=SECOND WEB BROWSER, LAUNCHING MODE=NONE, CONTROL OPTION=NONE
4. FOURTH SERVICE PROVIDER   :URL=http://333
      LAUNCHING BROWSER=FIRST WEB BROWSER, LAUNCHING MODE=2, CONTROL OPTION=5
5. FIFTH SERVICE PROVIDER    :URL=http://444.com
      LAUNCHING BROWSER=FIRST WEB BROWSER, LAUNCHING MODE=0, CONTROL OPTION=NONE
```

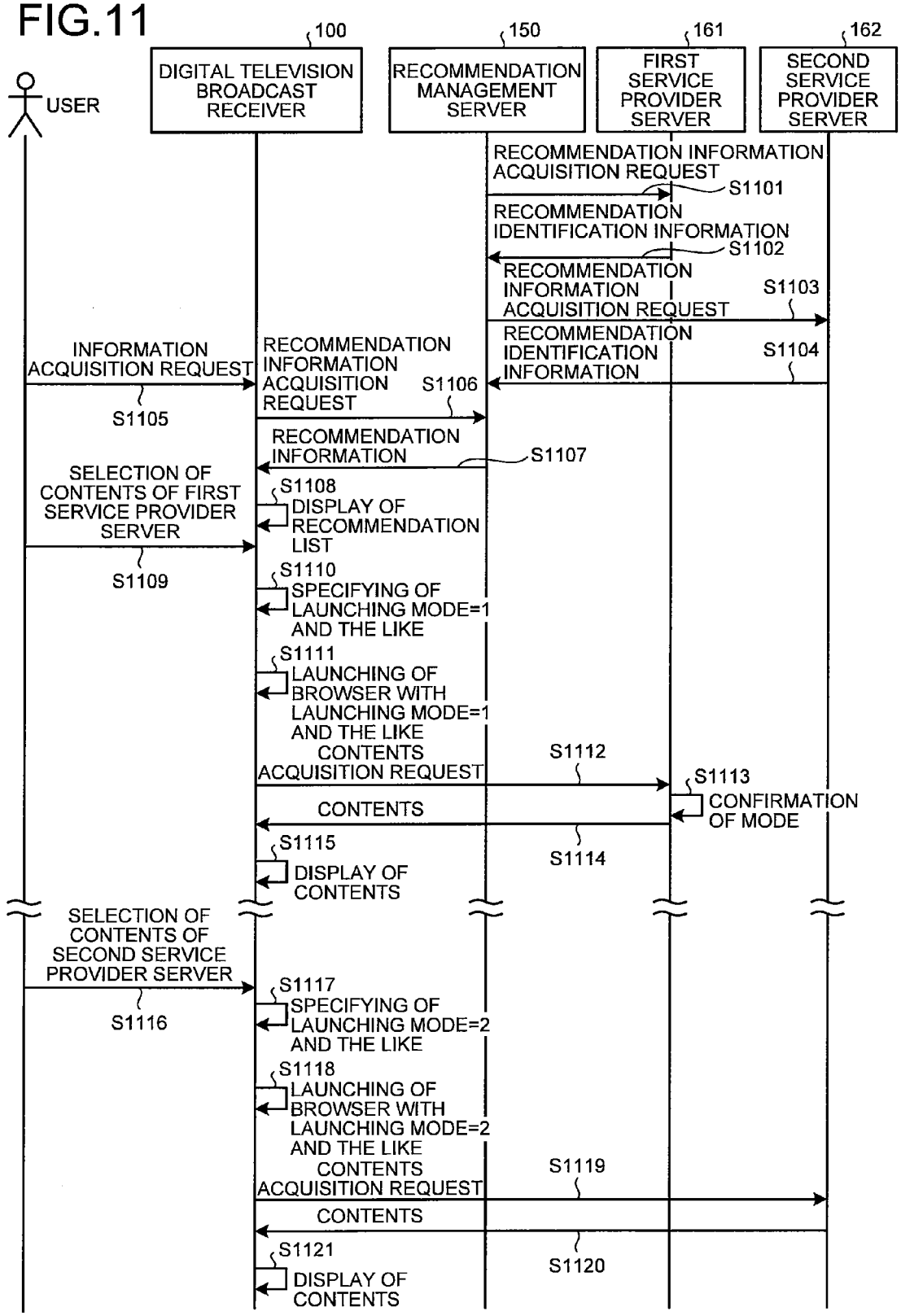

TELEVISION APPARATUS AND DISPLAY CONTROL METHOD

CROSS-REFERENCE TO RELATED APPLICATIONS

This application is based upon and claims the benefit of priority from Japanese Patent Application No. 2011-068930, filed Mar. 25, 2011, the entire contents of which are incorporated herein by reference.

FIELD

Embodiments described herein relate generally to a television apparatus and a display control method.

BACKGROUND

In recent years, such digital television broadcast receivers have been proposed which are equipped with a communication function for establishing a connection to the Internet and which allow viewing of motion picture contents distributed via the network.

With respect to such digital television broadcast receivers, various contents are provided from a network service via the network. In relation to that, various technologies have also been proposed to enable users search and view the intended contents from the various contents provided by the network service.

There are available a plurality of such contents-providing network services and each network service has a different setting for displaying the contents. Thus, with only a single display application (such as a Web browser), it is difficult to display the contents provided by all network services. Therein, in order to display all contents provided by each network service, it is necessary either to launch a plurality of display applications or to re-launch a single display application after changing the launching mode thereof. That makes it a difficult task to search for the intended contents from among the network services.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 5 is an exemplary illustration diagram of an example of the list screen information received by a receiver of the digital television broadcast receiver in the first embodiment;

FIG. 11 is an exemplary sequence diagram illustrating the sequence of operations by which the digital television broadcast receiver in the network configuration in the first embodiment displays the contents based on a recommended contents list screen.

DETAILED DESCRIPTION

In general, according to one embodiment, a television apparatus comprises: a specific receiver, a display controller, a selection receiver, and a setting controller. The specific receiver is configured to receive, from a communication apparatus connected via a network, list information of a plurality of network services each of which provides the data, destination information which indicates a connection destination for each of the network services included in the list information, and setting information which corresponds to each of the network services included in the list information and which indicates a setting to a display to receive the data from each of the network services. The display controller is configured to control displaying of the list information. The selection receiver is configured to receive a selection of the network service included in the list information that is displayed. The setting controller is configured to set the display according to the setting information corresponding to the network service of which the selection is received and configured to control the display to display the data received from the connection destination for the network service of which the selection is received that is indicated by the destination information.

According to another embodiment, a display control method implemented in a television apparatus, the display control method comprises: receiving, by a specific receiver, from a communication apparatus connected via a network, list information of a plurality of network services each of which provides the data, destination information which indicates a connection destination for each of the network services included in the list information, and setting information which corresponds to each of the network services included in the list information and which indicates a setting to a display to receive the data from each of the network services; display controlling, by a display controller, displaying of the list information; receiving, by a selection receiver, a selection of the network service included in the list information that is displayed; setting, by a setting controller, the display according to the setting information corresponding to the network service of which the selection is received; and controlling, by the setting controller, the display to display the data received from the connection destination for the network service of which the selection is received that is indicated by the destination information.

First Embodiment

Figure 1:
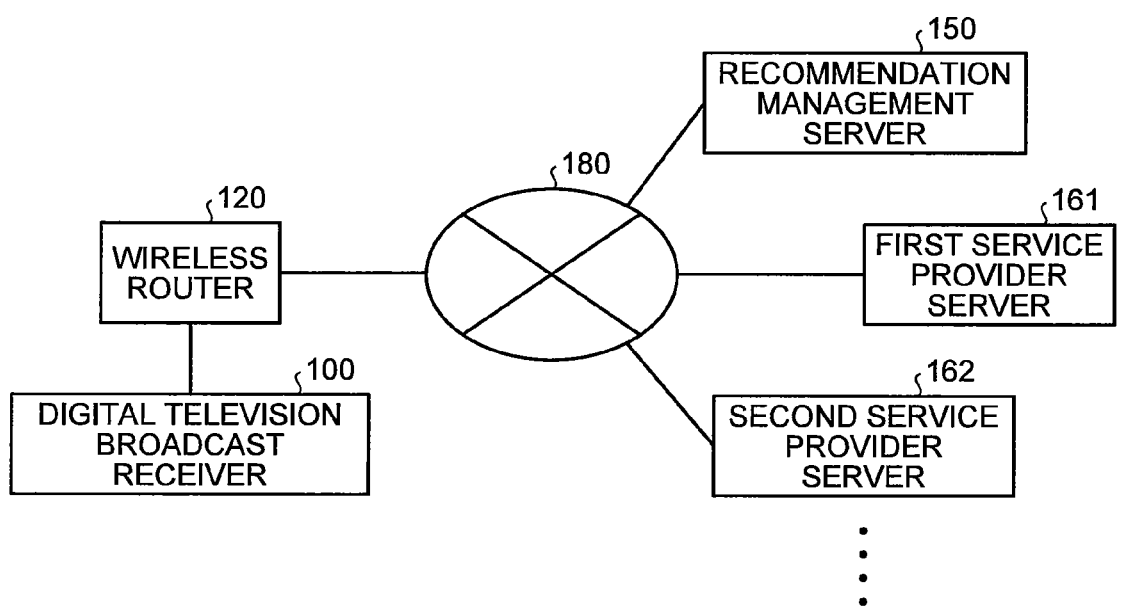
FIG. 1 is an exemplary illustration diagram of a network configuration according to a first embodiment.

FIG. 1 is an illustration diagram of a network configuration according to a first embodiment. In the network configuration illustrated in FIG. 1, a television apparatus in the embodiment is a digital television apparatus.

In the example illustrated in FIG. 1, in a network environment such as a home network environment, a connection is established between a wireless router 120 and a digital television broadcast receiver 100. Moreover, via a communication network 180, the digital television broadcast receiver 100 is connected to a recommendation management server 150, a first service provider server 161, and a second service provider server 162. Furthermore, although not illustrated in FIG. 1; third to fifth service provider servers are also connected to the communication network 180. Thus, in the first embodiment, the number of the service provider servers is assumed to be five. However, there is no restriction on the number of the service provider servers, and that number can be greater or smaller than five.

The first service provider server 161, the second service provider server 162, and the third to fifth service provider servers constitute a server group. Each of the first service provider server 161, the second service provider server 162, and the third to fifth service provider servers provides various contents to the digital television broadcast receiver 100. Herein, the contents provided by each of the first service provider server 161, the second service provider server 162, and the third to fifth service provider servers are displayed on a Web browser that is installed in the digital television broadcast receiver 100. When the contents are displayed on the Web browser, the Web browser is required to have different settings with respect to the contents provided by the first service provider server 161, with respect to the contents provided by the second service provider server 162, and with respect to the contents provided by the third to fifth service provider servers. Hence, while the contents provided by a particular service provider server are being displayed on the Web browser; if there is an attempt to display the contents provided by other service providers on the same Web browser, then the digital television broadcast receiver 100 starts a separate Web browser corresponding to each of the service provider servers. Alternatively, while the contents provided by a particular service provider server are being displayed on the Web browser; in order to display the contents provided by another service provider server, it is necessary to re-launch the Web browser that is already being used. Thus, in the first embodiment, the explanation is given for a case when each of the service provider servers functions as a network service that provides contents.

The recommendation management server 150 is configured to provide the digital television broadcast receiver 100 with information related to contents that can be provided or information related to the service provider servers. The recommendation management server 150 stores therein the information about which of the first service provider server 161, the second service provider server 162, and the third to fifth service provider servers are providing contents, or the information related to the recommended contents provided by each of the service provider servers. When the digital television broadcast receiver 100 checks the contents of each of the service provider servers, the digital television broadcast receiver 100 has to have a different setting for each of the service provider servers. With regard to that, in the first embodiment, the recommendation management server 150 provides the information regarding each of the service provider servers. For that reason, without having to re-launch the Web browser or without having to launch a plurality of Web browsers, the digital television broadcast receiver 100 can check the information regarding the service provider servers.

Figure 2:
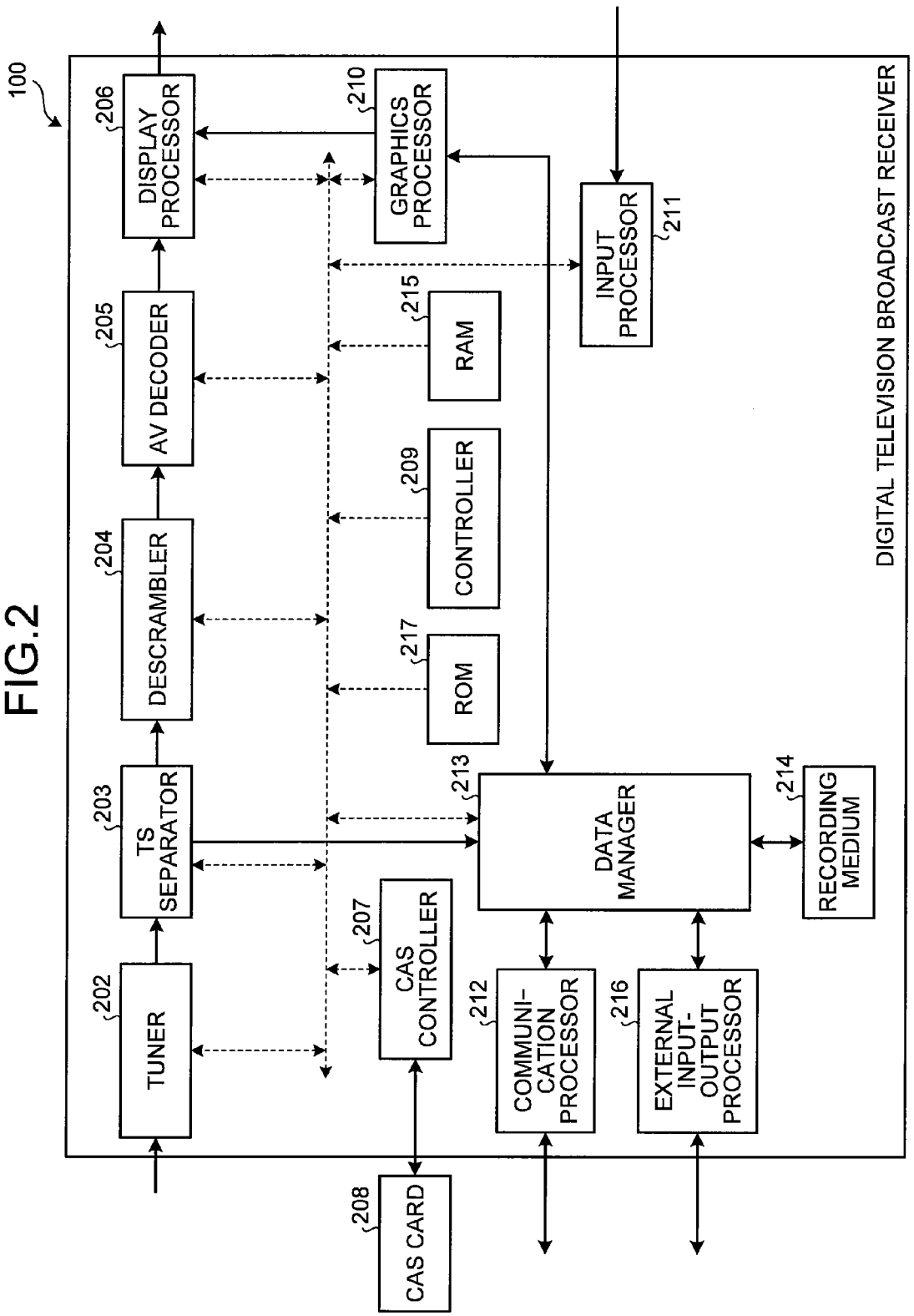
FIG. 2 is an exemplary block diagram of a hardware configuration of a digital television broadcast receiver in the first embodiment.

FIG. 2 is a block diagram of a hardware configuration of the digital television broadcast receiver 100. Herein, the digital television broadcast receiver 100 comprises a tuner 202, a TS separator 203, a descrambler 204, an AV decoder 205, a display processor 206, a CAS controller 207, a CAS card 208, a controller 209, a graphics processor 210, an input processor 211, a communication processor 212, a data manager 213, a recording medium 214, a random access memory (RAM) 215, an external input-output processor 216, and a read only memory (ROM) 217.

From the broadcast waves input to the digital television broadcast receiver 100, the tuner 202 selects an intended channel and outputs the transport stream (hereinafter, referred to as "TS") of the selected channel to the TS separator 203.

From the TS input from the tuner 202, the TS separator 203 separates necessary packets. Moreover, from the separated packets, the TS separator 203 extracts the broadcast program signals (video, audio) or separates a variety of multiplexed data (a variety of service information (SI) data or ECC, EMM, and the like). The TS separator 203 outputs the separated broadcast program signals to the descrambler 204.

The descrambler 204 has a scramble key set therein. The scramble key is obtained from the CAS card 208 connected via the CAS controller 207. The descrambler 204 performs descrambling of the TS and outputs the descrambled TS to the AV decoder 205.

The AV decoder 205 decodes the broadcast program signals (video, audio) input from the descrambler 204, and outputs the decoded broadcast program signals to the display processor 206.

The display processor 206 outputs the broadcast program signals (video, audio), which have been input from the AV decoder 205, to an external display apparatus such as a monitor (not illustrated) for the purpose of video and audio replaying.

Moreover, the display processor 206 has the function of either substituting the data generated in the graphics processor 210 with the AV signals or synthesizing the data and the AV signals to output the result.

The communication processor 212 is connected to a network line such as Ethernet (registered trademark), and performs communication of data via the network. For example, the communication processor 212 has the functions of receiving the contents provided by each of the service provider servers and receiving the information from the recommendation management server 150 regarding each of the service provider servers. The received information is then output to the controller 209 and the like.

The recording medium 214 is a readable/writable recording medium. The external input-output processor 216 is, for example, configured to perform reading/writing of a recording medium such as a secure digital card interface (SD card I/F) or configured to be a standard interface function such as a universal serial bus interface (USB I/F) for performing reading/writing with respect to the device or medium connected thereto.

The data manager 213 manages the data input from the communication processor 212 or the external input-output processor 216. Moreover, the data manager 213 performs data usage determination or performs recording control with respect to the recording medium 214, and furnishes data to the graphics processor 210. Furthermore, the data manager 213 performs reading and writing with respect to the information stored in the recording medium 214.

The ROM 217 stores therein the computer programs that are read and executed by the controller 209. Moreover, the ROM 217 stores therein internal list information, which contains a list of the service provider servers each of which provides contents to be displayed on the Web browser. Furthermore, the ROM 217 also stores therein the information needed for establishing connection with each of the service provider servers listed in the internal list information. Besides, in the ROM 217 is stored the uniform resource locator (URL) of the recommendation management server 150.

The controller 209 controls the digital television broadcast receiver 100 in entirety. For example, the controller 209 controls the functions of each such block inside the digital television broadcast receiver 100 that is connected to the controller 209 by bus connection or serial communication connection and the like. Moreover, the controller 209 reads computer programs from the ROM 217 and executes them so as to implement various functions.

The RAM 215 is used as a work space for the controller 209. For example, in the RAM 215 is stored list screen information of service provider servers that is received from the recommendation management server 150.

Figure 3:
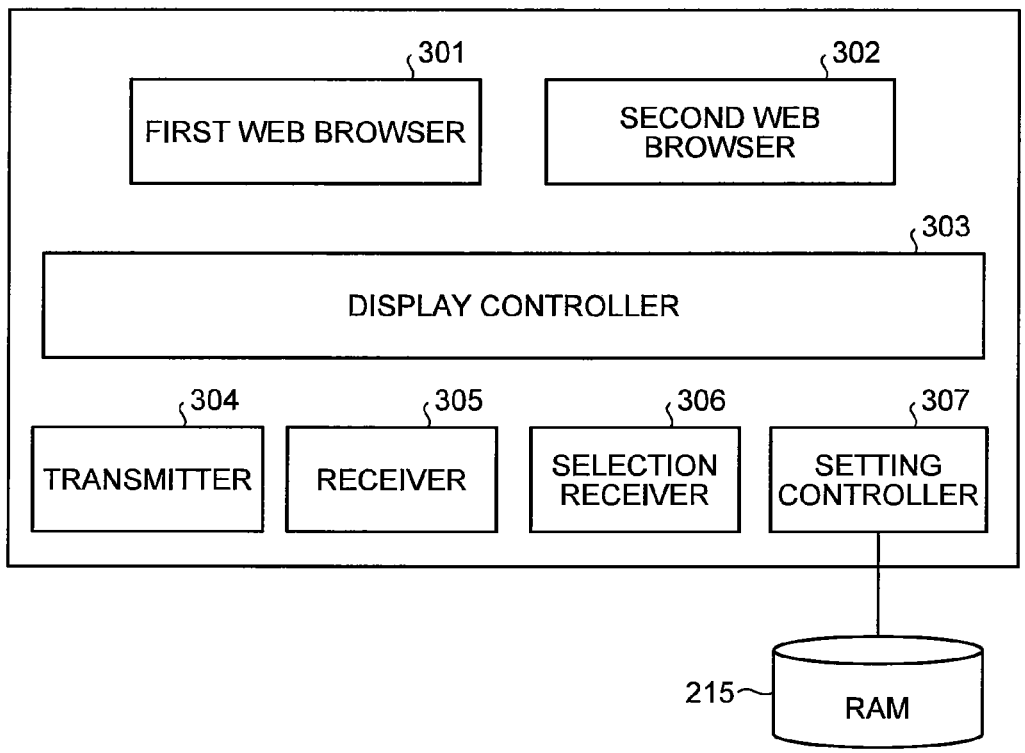
FIG. 3 is an exemplary block diagram of a software configuration that is implemented by a controller of the digital television broadcast receiver in the first embodiment.

FIG. 3 is a block diagram of a software configuration that is implemented when the controller 209 reads a contents processing program from the RAM 215. As illustrated in FIG. 3, a first Web browser 301, a second Web browser 302, a display controller 303, a transmitter 304, a receiver 305, a selection receiver 306, and a setting controller 307 are implemented as part of the software configuration in the controller 209 of the digital television broadcast receiver 100.

Under the control of the display controller 303, the first Web browser 301 and the second Web browser 302 display data on the display processor 206 illustrated in FIG. 2. The data that are displayed contains the contents provided by each of the service provider servers.

The display controller 303 controls the display processor 206 to display data. For example, the display controller 303 performs control so as to display the list screen information of the service provider servers that provide the contents. The list screen information displayed by the display controller 303 is stored in advance in the RAM 215.

Figure 4:
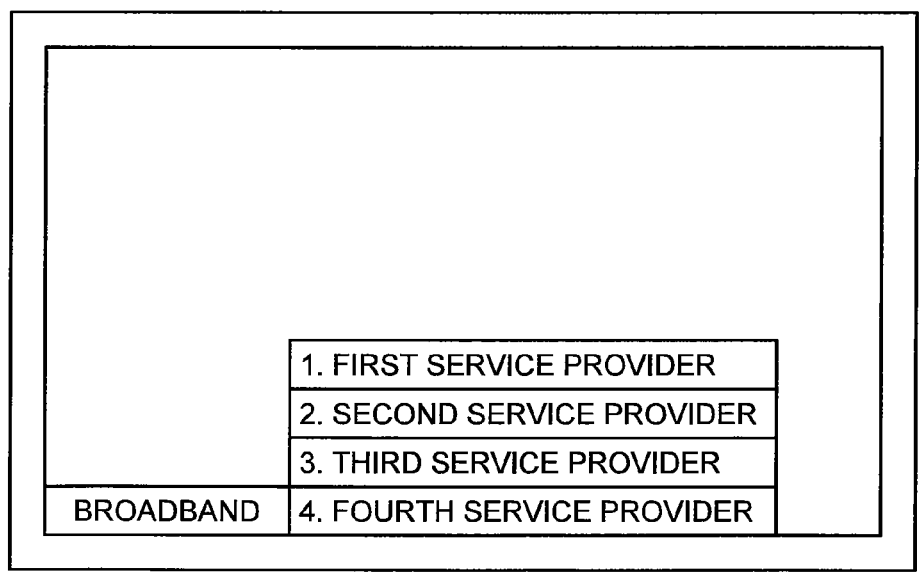
FIG. 4 is an exemplary illustration diagram of an example of a screen that appears when a display controller of the digital television broadcast receiver in the first embodiment displays list screen information that is stored in a read only memory (ROM)

FIG. 4 is an illustration diagram of an example of a screen that appears at the time of displaying the list screen information stored in the ROM. The list screen information illustrated in FIG. 4 has a tree structure having "broadband" displayed at an upper layer and having "first service provider", "second service provider", "third service provider" and "fourth service provider" displayed in a selectable manner at a lower layer.

From the servers (e.g., the recommendation management server 150, the first service provider server 161, the second service provider server 162, etc.) connected through the network, the receiver 305 receives information via the communication processor 212.

Meanwhile, there are times when the service provider servers (network services) providing contents to the digital television broadcast receiver 100 increase or decrease in number. In such a case, the number of the service provider servers included in the list screen information stored in the RAM 215 is different from the actually increased or decreased number. Besides, due to a termination of the service provided by a particular service provider; there occur errors in which, although the particular service provider is listed in the list screen information, the service provided by such service provider cannot be started. With regard to that, the digital television broadcast receiver 100 can also have the option of accessing a common portal from a Web browser (e.g., the first Web browser 301). However, since that particular Web browser cannot respond to the services provided by all service provider servers, it becomes necessary either to switch between a plurality of browsers or, in the case of using the same browser, re-launch the browser by changing the launching modes. Therein, the receiver 305 is configured to receive the list screen information.

For example, from the recommendation management server 150 via the communication network 180, the receiver 305 receives the list screen information containing the list of the service provider servers each of which provides contents to be displayed on the Web browsers. Herein, the list screen information contains the URLs indicating the connection destinations for the service provider servers and contains setting information corresponding to each of the service provider servers. The setting information corresponding to each of the service provider servers indicates the Web browser name of the Web browser receiving the contents provided by the corresponding service provider server and contains the settings performed with respect to the corresponding Web browser. In this way, for each of the service provider servers listed in the list screen information, the receiver 305 is configured to receive the Web browser name so that it becomes possible to identify the Web browser used to display the contents provided by the corresponding service provider server.

FIG. 5 is an illustration diagram of an example of the list screen information received by the receiver 305. As illustrated in FIG. 5, the list screen information contains "display format" and contains service provider names for identifying the service provider servers. The service provider names are displayed in a selectable manner on the screen on which the list screen information is displayed. Moreover, in the list screen information, the following information is provided correspondingly to each of the service provider servers: the URL of that service provider server, the Web browser necessary to receive the contents provided by that service provider server, the launching mode at the time of starting that Web browser, and a control option serving as a necessary setting for that Web browser. In the first embodiment, the launching modes and the control options are used as the examples of the setting information. Alternatively, it is also possible to make use of the information that is set with respect to the Web browser. Still alternatively, the information that is set not only with respect to the Web browser but is set also with respect to the receiver can also be used. Still alternatively, it is also possible to make use of the information that is used for obtaining the information set in the receiver. That is, it is possible to make use of such instruction information which enables a selection of the intended information from among a variety of ID information and the like stored inside the receiver as useragent to be appended at the time of accessing from the Web browser.

Then, the display controller 303 performs control so as to display the service provider names listed in the list screen information as selectable items according to "display format" indicated in the list screen information.

Figure 6:
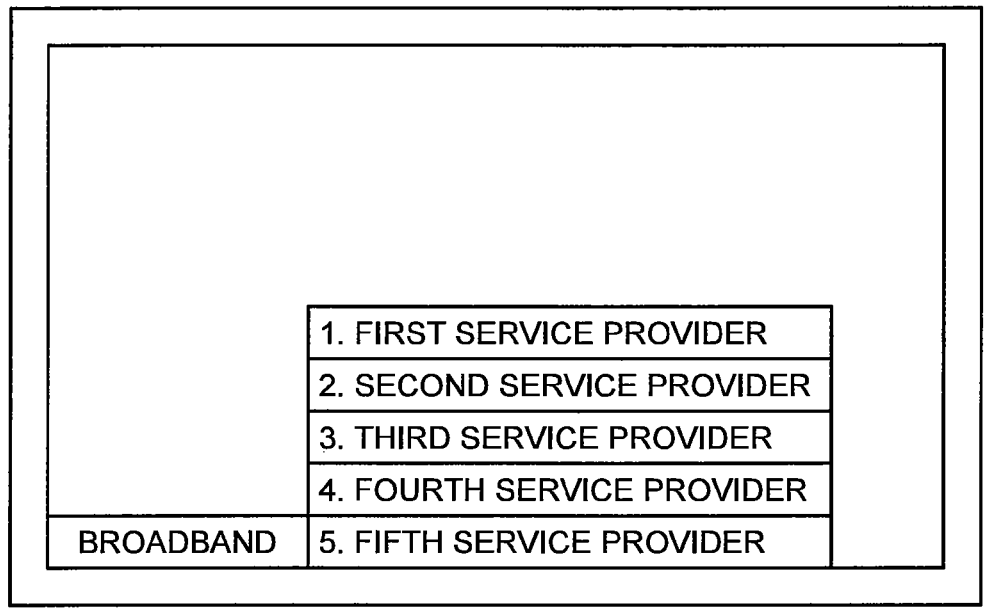
FIG. 6 is an exemplary illustration diagram of a first example of a screen that appears when the display controller of the digital television broadcast receiver in the first embodiment displays the list screen information that has been received.

FIG. 6 is an illustration diagram of an example of a screen that appears when the display controller 303 displays the list screen information that has been received. The list screen information illustrated in FIG. 6 has a tree structure similar to that illustrated in FIG. 4. As compared to the screen illustrated in FIG. 4, the screen illustrated in FIG. 6 has "fifth service provider" added therein as a selectable item. Herein, the screen illustrated in FIG. 6 is modified due to the addition of the fifth service provider server that provides contents to the digital television broadcast receiver 100.

Figure 7:
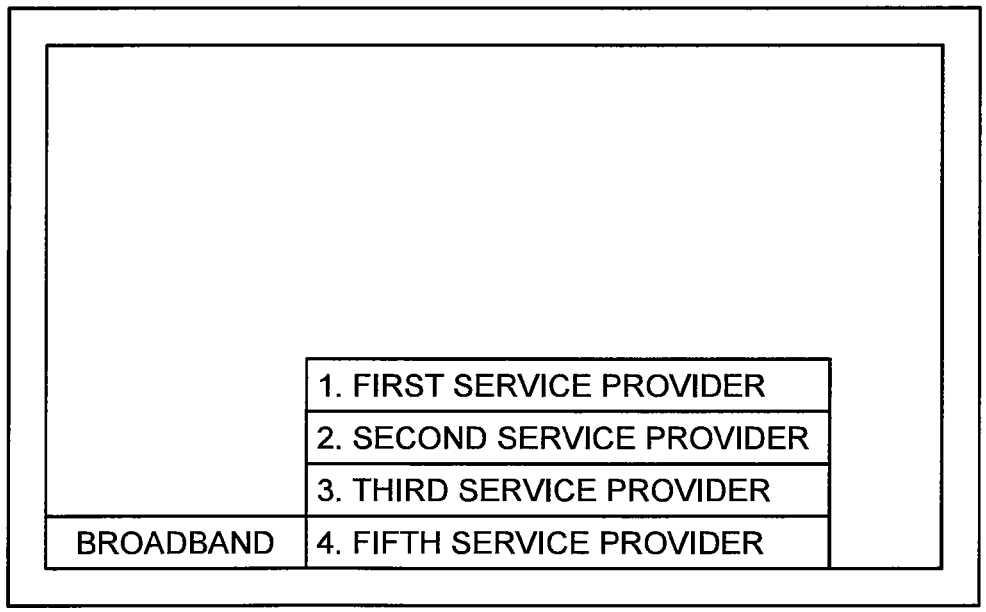
FIG. 7 is an exemplary illustration diagram of a second example of a screen that appears when the display controller of the digital television broadcast receiver in the first embodiment displays the list screen information that has been received.

Meanwhile, the screen displayed by the display controller 303 based on the list screen information is not limited to the example illustrated in FIG. 6. For example, FIG. 7 illustrates an alternative screen. As compared to the screen illustrated in FIG. 4, in the screen illustrated in FIG. 7, "fourth service provider" is deleted and "fifth service provider" is added as a selectable item. Herein, the screen illustrated in FIG. 7 is modified due to the deletion of the fourth service provider and the addition of the fifth service provider server that provides contents to the digital television broadcast receiver 100. In this way, in the digital television broadcast receiver 100, the items displayed in the list screen can be increased or decreased according to the increase or decrease in the number of the service provider servers that provide contents.

Thus, when the digital television broadcast receiver 100 is not connected to the recommendation management server 150, a screen based on the internal list information stored in the ROM 217 is displayed. In contrast, when the digital television broadcast receiver 100 is connected to the recommendation management server 150, a list screen based on the list screen information received by the receiver 305 is displayed.

Figure 8:
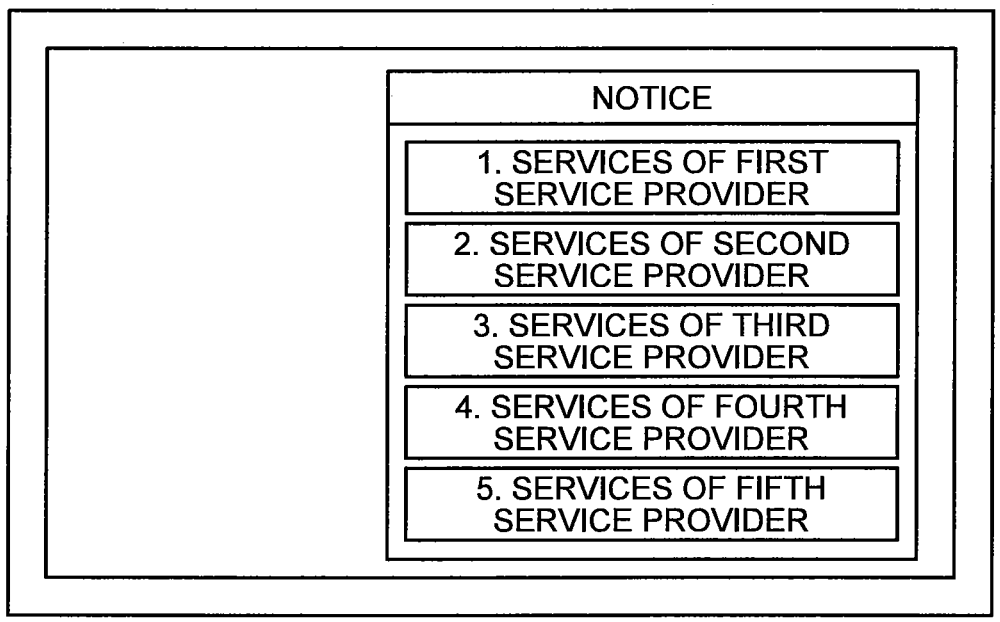
FIG. 8 is an exemplary illustration diagram of a list screen that contains the names of selectable service providers and that is displayed on a first Web browser by the display controller of the digital television broadcast receiver in the first embodiment.

Meanwhile, the list screen displayed by the display controller 303 is not limited to the examples illustrated in FIG. 4, FIG. 6, and FIG. 7. Alternatively, the display controller 303 can display the list of the service providers on the Web browser. FIG. 8 is an illustration diagram of a list screen that contains the names of the selectable service providers and that is displayed on the first Web browser 301. It is assumed that the list screen illustrated in FIG. 8 is displayed based on the list screen information received from the recommendation management server 150. In the list screen information that has been received, a variety of information (e.g., URL, launching browser, launching mode, control option) is included that is used for receiving the contents provided by each of the service providers listed in the list screen.

The selection receiver 306 receives the selection of the service provider names (the selection of the service providers) listed in the list screen information that is displayed by the display controller 303.

The transmitter 304 transmits, via the communication processor 212, information to the servers (e.g., the recommendation management server 150, the first service provider server 161, the second service provider server 162, etc.) that are connected through the network.

For example, with respect to the service provider server of which the selection is received by the selection receiver 306 (hereinafter referred to as the selected service provider server), the transmitter 304 transmits a contents acquisition request.

The setting controller 307 launches a Web browser (the first Web browser 301 or the second Web browser 302) that is identified as the launching browser corresponding to the selected service provider server in the list screen information. At that time, the launching mode corresponding to the selected service provider server in the list screen information is implemented. Besides, according to the setting information such as the control option corresponding to the selected service provider server, the setting controller 307 sets the Web browser (the first Web browser 301 or the second Web browser 302). Subsequently, via the display controller 303, the setting controller 307 displays the contents received from the selected service provider server on the Web browser that has been launched.

Figure 9:
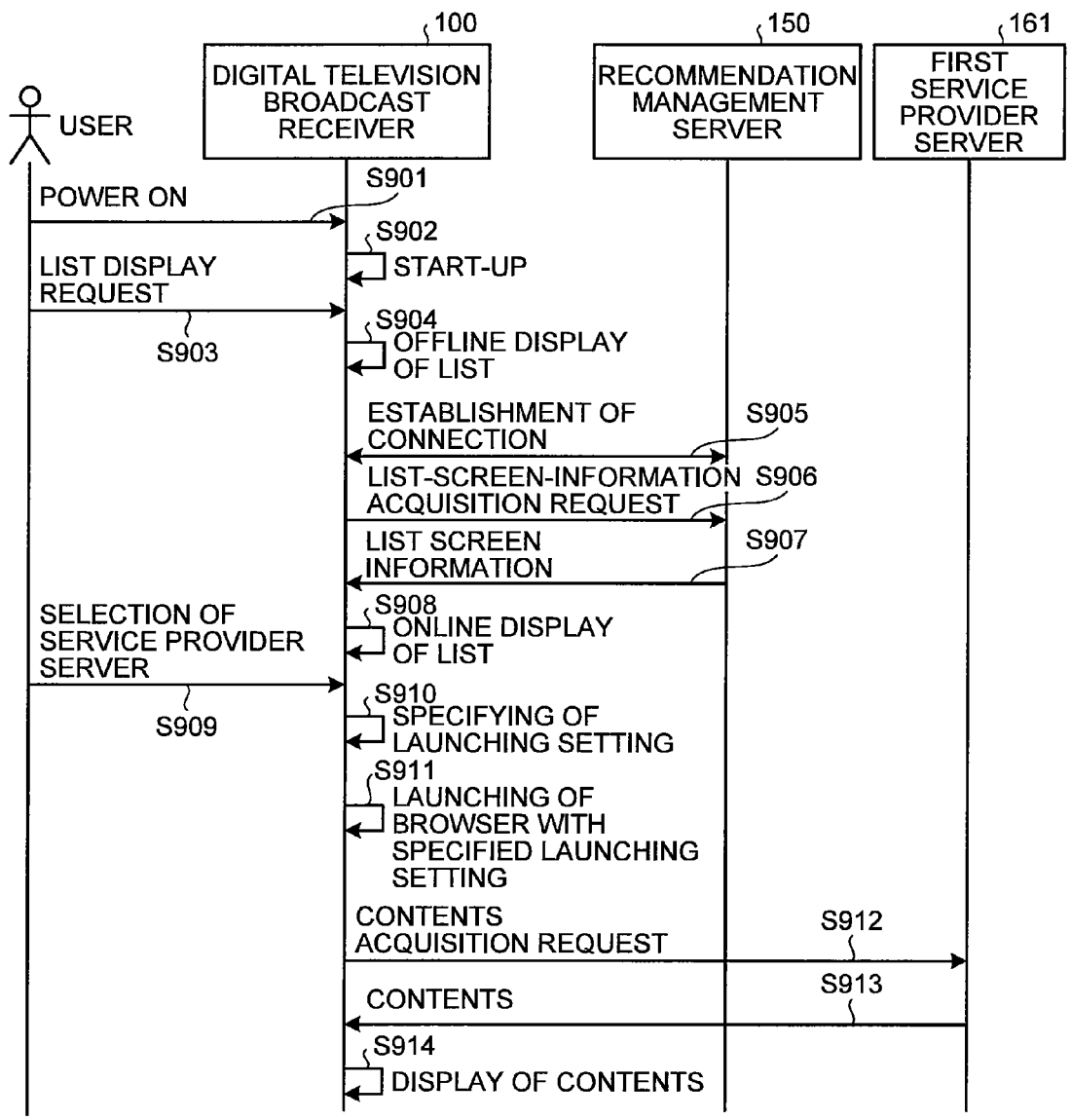
FIG. 9 is an exemplary sequence diagram illustrating the sequence of operations by which the digital television broadcast receiver in the network configuration in the first embodiment displays contents.

Explained below are the operations by which the digital television broadcast receiver 100 in the network configuration according to the first embodiment displays contents. FIG. 9 is a sequence diagram illustrating the sequence of the abovementioned operations performed among the devices in the network configuration according to the first embodiment.

Firstly, the digital television broadcast receiver 100 is subjected to a user operation of switching ON the power (S901). As a result, the digital television broadcast receiver 100 starts functioning (S902).

Subsequently, the selection receiver 306 of the digital television broadcast receiver 100 receives from the user a display request for displaying the list of the service providers each of which provides contents (S903).

At this stage, it is assumed that, due to reasons such as network delay, a connection is yet to get established between the digital television broadcast receiver 100 and the communication network 180. Hence, no connection can be established with the recommendation management server 150. In such a case, the display controller 303 of the digital television broadcast receiver 100 refers to the list screen information stored in the ROM 217 to display offline the list of the service provider servers (S904). Herein, it is assumed that the screen illustrated in FIG. 4 gets displayed.

Subsequently, it is assumed that, due to the normalization of the network, a connection gets established between the digital television broadcast receiver 100 and the recommendation management server 150 (S905).

In that case, to the recommendation management server 150 via the communication processor 212, the transmitter 304 of the digital television broadcast receiver 100 transmits a list-screen-information acquisition request (S906).

Then, the digital television broadcast receiver 100 receives the list screen information from the recommendation management server 150 (S907). According to the received list screen information, the display controller 303 of the digital television broadcast receiver 100 displays online the list of the service provider servers (S908). Herein, it is assumed that the screen illustrated in FIG. 6 gets displayed.

Subsequently, the selection receiver 306 receives the user selection of a service provider server (S909). In the present sequence, it is assumed that the first service provider server 161 is selected.

Upon receiving the selection, the setting controller 307 refers to the list screen information for all information corresponding to the selected service provider server to specify a launching setting regarding the Web browser such as the launching browser, the launching mode, and the control option (S910).

Subsequently, the setting controller 307 specifies the Web browser (the first Web browser 301 or the second Web browser 302) that has been identified as the launching browser in the launching setting to launch that Web browser under the specified launching setting (launching mode and control option) (S911). As a result, such a Web browser is launched that is suitable to the service provider server selected by the user.

Then, according to the instructions from the Web browser (the first Web browser 301 or the second Web browser 302) that has been launched, the transmitter 304 transmits a contents acquisition request to the first service provider server

161 (S912). Meanwhile, the contents acquisition request can also contain the information related to the launched Web browser.

Upon receiving the contents acquisition request, the first service provider server 161 transmits the contents to the digital television broadcast receiver 100 (S913). Meanwhile, prior to the transmission, the first service provider server 161 can also check, based on the received information, whether the Web browser in the digital television broadcast receiver 100 is launched according to proper settings.

Once the receiver 305 of the digital television broadcast receiver 100 receives the contents, the display controller 303 displays the received contents on the Web browser under the control of the setting controller 307 (S914).

By following the abovementioned sequence of operations, it is possible to display the contents provided by any desired service provider server.

Meanwhile, the information displayed by the digital television broadcast receiver 100 is not limited to the information related to the service provider server, but can also be the information related to the contents. For example, assume that the receiver 305 of the digital television broadcast receiver 100 receives, from the recommendation management server 150, the information (such as contents names) for identifying the contents provided by each of the service provider servers. In that case, the display controller 303 performs control so as to display the received content names.

Figure 10:
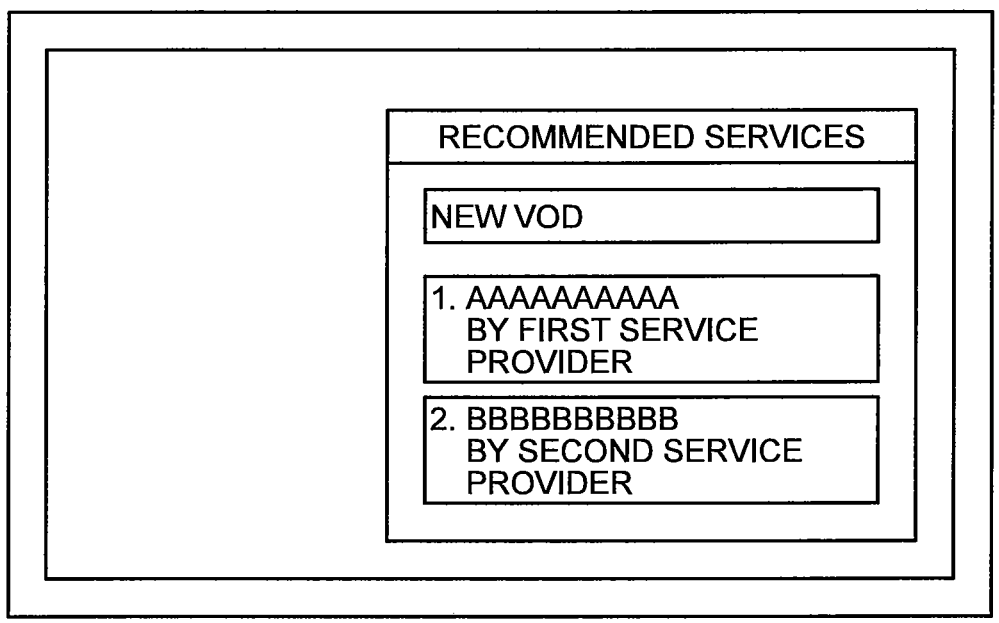
FIG. 10 is an exemplary illustration diagram of an example of a recommended contents list screen displayed by the display controller of the digital television broadcast receiver in the first embodiment.

FIG. 10 is an illustration diagram of an example of a recommended contents list screen displayed by the display controller 303. As illustrated in FIG. 10, the contents recommended by each of the service providers are displayed in a corresponding manner with the service provider. Through the recommended contents list screen that is displayed, the selection receiver 306 receives the user selection of content names.

Then, the setting controller 307 sets the Web browser according to the launching setting corresponding to that service provider server which provides the contents identified by the selected content names. Once the contents are received from the service provider server, the display controller 303 performs control so as to display the contents on the Web browser under the control of the setting controller 307.

Explained below are the operations by which the digital television broadcast receiver 100 in the network configuration according to the first embodiment displays the contents based on the recommended contents list screen. FIG. 11 is a sequence diagram illustrating the sequence of the abovementioned operations performed among the devices in the network configuration according to the first embodiment.

Firstly, the recommendation management server 150 transmits a recommendation information acquisition request to the first service provider server 161 (S1101). Then, the first service provider server 161 transmits the information for identifying the recommended contents to the recommendation management server 150 (S1102). A similar communication related to the recommended contents is also performed between the recommendation management server 150 and the second service provider server 162 (S1103 and S1104).

Subsequently, the digital television broadcast receiver 100 receives an information acquisition request from the user (S1105). Meanwhile, an acquisition request of information is not limited to the information acquisition request. Alternatively, the acquisition request of information can also be performed in response to switching ON the power. Moreover, it is assumed that the connection between the digital television broadcast receiver 100 and the recommendation management server 150 is already established.

Then, to the recommendation management server 150 via the communication processor 212, the transmitter 304 of the digital television broadcast receiver 100 transmits an information acquisition request regarding the information for identifying the recommended contents (S1106).

Subsequently, from the recommendation management server 150, the digital television broadcast receiver 100 receives the information for identifying the recommended contents of each of the service provider servers that the recommendation management server 150 had obtained from each of the service provider servers (S1107). According to the information for identifying the recommended contents received by the digital television broadcast receiver 100, the display controller 303 of the digital television broadcast receiver 100 displays a list of the recommended contents of each of the service provider servers (S1108). Herein, it is assumed that the screen illustrated in FIG. 10 gets displayed.

Then, the selection receiver 306 receives the user selection of the contents of the first service provider server 161 (S1109). For example, "AAAAAAAAAA" illustrated in FIG. 10 is assumed to be the selected content.

Once the selection is received, the setting controller 307 specifies the launching setting corresponding to the first service provider server 161 of which the contents is selected (S1110). More particularly, the setting controller 307 specifies the following launching setting: the launching browser=the first Web browser 301, the launching mode=1, and the control option=4.

Subsequently, the setting controller 307 launches the first Web browser 301 with the launching mode=1 and the control option=4 (S1111).

Subsequently, according to the instructions from the first Web browser 301, the transmitter 304 transmits a contents acquisition request to the first service provider server 161 (S1112). Herein, the contents acquisition request contains the information related to the Web browser that has been launched.

Upon receiving the contents acquisition request, the first service provider server 161 confirms, from the information included in the contents acquisition request, whether the first Web browser 301 has been launched with the launching mode=1 in the digital television broadcast receiver 100 (S1113). Then, the first service provider server 161 transmits the contents to the digital television broadcast receiver 100 (S1114).

Once the receiver 305 of the digital television broadcast receiver 100 receives those contents, the display controller 303 displays the received contents on the first Web browser 301 under the control of the setting controller 307 (S1115).

Subsequently, through the recommended contents list screen, the selection receiver 306 receives the user selection of the contents of the second service provider server 162 (S1116). For example, "BBBBBBBBBB" illustrated in FIG. 10 is assumed to be the selected content.

Once the selection is received, the setting controller 307 specifies the launching setting corresponding to the second service provider server 162 of which the contents is selected (S1117). More particularly, the setting controller 307 identifies the following launching setting: the launching browser=the first Web browser 301, the launching mode=2, and the control option=3. Since these specified launching setting is different than the launching setting for the first service provider server 161, the first Web browser 301 needs to be launched anew.

Therein, the setting controller 307 launches the first Web browser 301 with the launching mode=2 and the control option=3 (S1118).

Subsequently, according to the instructions from the first Web browser 301, the transmitter 304 transmits a contents acquisition request to the second service provider server 162 (S1119). Herein, upon receiving the contents acquisition request, it is assumed that the second service provider server 162 does not confirm the status of the first Web browser 301.

Then, the second service provider server 162 transmits the contents to the digital television broadcast receiver 100 (S1120).

When the receiver 305 of the digital television broadcast receiver 100 receives those contents, the display controller 303 displays the received contents on the first Web browser 301 under the control of the setting controller 307 (S1121).

By following the abovementioned sequence of operations, it is possible to display the contents provided by the service provider servers.

In the digital television broadcast receiver 100 according to the first embodiment, even in the case when the setting for receiving the provided contents is different for each of the network services (each of the service provider servers), a single list of all of the network services is displayed. Therefore, the enhancement in the visibility is achieved. Besides, when a network service is selected from the displayed list, a Web browser and a setting suitable to the selected network service are obtained from the recommendation management server 150. That spares the user from paying attention to the differences in the setting for each of the network services. Hence, when the user can perform operations, the uncomfortable feeling of the user is reduced. That leads to an improvement in the user-friendliness at the time of viewing the contents.

Meanwhile, a contents processing program executed in the digital television broadcast receiver 100 according to the first embodiment is stored in advance in a ROM or the like.

Alternatively, the contents processing program executed in the digital television broadcast receiver 100 according to the first embodiment can be provided in the form of an installable or executable file on a computer-readable recording medium such as a compact disk read only memory (CD-ROM), a flexible disk (FD), a compact disk readable (CD-R), or a digital versatile disk (DVD).

Still alternatively, the contents processing program executed in the digital television broadcast receiver 100 according to the first embodiment can be saved as a downloadable file on a computer connected to the Internet or can be made available for distribution through a network such as the Internet. Still alternatively, the contents processing program executed in the digital television broadcast receiver 100 according to the first embodiment can be distributed over a network such as the Internet.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A television apparatus comprising:
   a first receiver configured to receive, from a communication apparatus connected over a network, list information for a plurality of network services each of which provides data, destination information which indicates a connection destination for each of the network services included in the list information, and setting information for each of the network services included in the list information, the setting information corresponding to a respective network service indicating settings for displaying data received from the respective network service;
   a display controller configured to control a display to display the list information;
   a second receiver configured to receive a selection of one of the network services included in the list information that is displayed;
   a setting controller configured to set, via one or more processors, settings for displaying data according to the setting information corresponding to the selected one of the network services; and
   a memory configured to store therein a plurality of web browsers for performing display on the display, wherein
   for each of the network services included in the list information, the first receiver is configured to receive application identification information used to identify one of the web browsers used to display data from a corresponding network service, and
   the setting controller is configured to control the one of the web browsers identified by using the application identification information to display the data.

2. The television apparatus of claim 1, further comprising a memory configured to store therein internal list information that contains a list of network services providing data to be displayed on the display, wherein
   when the television apparatus is not connected to the communication apparatus, the display controller controls the display to display the internal list information stored in the memory, and when the television apparatus is connected to the communication apparatus, the display controller controls the display to display the list information received by the first receiver.

3. The television apparatus of claim 1, wherein
   from the communication apparatus, the first receiver is configured to receive data identification information used to identify data provided by each of the network services,
   the display controller is configured to control the display to display the data identification information,
   the second receiver is configured to receive a selection of the data identification information, and
   the setting controller is configured to set the display according to the setting information corresponding to the network service which provides the data identified by the selected data identification information.

4. The television apparatus of claim 1, wherein the setting information comprises:
   information set with respect to the one of the web browsers; and
   at least one of information set with respect to the television apparatus and information used for obtaining the information set in the television apparatus.

5. A display control method implemented in a television apparatus comprising a memory configured to store therein a plurality of web browsers, the display control method comprising:

receiving, by a first receiver, from a communication apparatus connected over a network, list information for a plurality of network services each of which provides data, destination information which indicates a connection destination for each of the network services included in the list information, and setting information for each of the network services included in the list information, the setting information corresponding to a respective network service indicating settings for displaying data received from the respective network service;

controlling, by a display controller, displaying of the list information on a display;

receiving, by a second receiver, a selection of one of the network services included in the list information that is displayed;

setting, by a setting controller, the display according to the setting information corresponding to the selected one of the network services;

launching, by the setting controller, one of the web browsers for the corresponding selected one of the network services after the display is set according to the setting information; and controlling, by the setting controller and via one or more processors, the one of the web browsers to display the data after the one of the web browsers is launched.

6. The television apparatus of claim 5, wherein the setting information comprises:

information set with respect to the one of the web browsers; and at least one of information set with respect to the television apparatus and information used for obtaining the information set in the television apparatus.

* * * * *